US009659258B2

(12) United States Patent
Cao et al.

(10) Patent No.: US 9,659,258 B2
(45) Date of Patent: May 23, 2017

(54) GENERATING A TRAINING MODEL BASED ON FEEDBACK

(71) Applicant: INTERNATIONAL BUSINESS MACHINES CORPORATION, Armonk, NY (US)

(72) Inventors: Liangliang Cao, Amherst, MA (US); Ning Duan, Shanghai (CN); Qian Lin, Guangzhou (CN); Chen Wang, Beijing (CN); Junchi Yan, Shanghai (CN); Xin Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 14/025,208

(22) Filed: Sep. 12, 2013

(65) Prior Publication Data
US 2015/0074021 A1     Mar. 12, 2015

(51) Int. Cl.
*G06F 17/50*     (2006.01)
*G06N 99/00*     (2010.01)
*G06N 3/08*     (2006.01)
*G06N 7/02*     (2006.01)
*G06N 5/02*     (2006.01)

(52) U.S. Cl.
CPC ............ *G06N 99/005* (2013.01); *G06N 3/08* (2013.01); *G06N 3/088* (2013.01); *G06N 5/025* (2013.01); *G06N 7/023* (2013.01)

(58) Field of Classification Search
None
See application file for complete search history.

(56) References Cited

U.S. PATENT DOCUMENTS

| 7,519,562 B1 * | 4/2009 | Vander Mey | G06Q 30/02 705/12 |
| 2006/0020630 A1 * | 1/2006 | Stager | G06K 9/00993 |

(Continued)

FOREIGN PATENT DOCUMENTS

| CN | 101777060 A | 7/2010 |
| CN | 102163286 A | 8/2011 |

OTHER PUBLICATIONS

M. Shyu, et al., "Video Semantic Event/Concept Detection Using a Subspace-Based Multimedia Data Mining Framework," IEEE Transactions on Multimedia, Feb. 2008, vol. 10, No. 2, pp. 252-259.*

(Continued)

*Primary Examiner* — Aniss Chad
*Assistant Examiner* — David M Rogers
(74) *Attorney, Agent, or Firm* — Tutunjian & Bitetto, P.C.; David Quinn

(57) ABSTRACT

A method and apparatus for generating a training model based on feedback are provided. The method for generating a training model based on feedback, includes calculating an eigenvector of a sample among a plurality of samples; obtaining scores granted by a user for one or more of the plurality of samples in a round, obtaining scores granted by the user for a first number of samples; obtaining scores granted by the user for a second number of samples in response to detecting, based on the eigenvector, an inconsistency between the scores granted by the user for the first number of samples; and generating a training model based on the scores granted by the user for the first and second numbers of samples. A corresponding apparatus is also provided.

8 Claims, 8 Drawing Sheets

(56) References Cited

U.S. PATENT DOCUMENTS

2010/0318540 A1* 12/2010 Svore .............. G06K 9/6257
                                                    707/759
2011/0235900 A1   9/2011 Porikli et al.
2011/0311141 A1* 12/2011 Gao ............... G06K 9/00416
                                                    382/187
2012/0059850 A1   3/2012 Bent et al.

OTHER PUBLICATIONS

H. Liao, "Image Retrieval Based on MD5," 2008 International Conference on Advanced Computer Theory and Engineering, IEEE, Dec. 20, 2008, pp. 987-991.*

Chen, S. et al., "Relevant Feedback Method for Image Retrieval Using Composite Score," Journal of Chinese Computer Systems, vol. 32, No. 12, May 2011. (pp. 2481-2486).

Whitehill, J., et al. "Personalized Facial Attractiveness Prediction" IEEE International Conference on Automatic Face and Gesture Recognition—FGR. Sep. 2008. pp. 1-7.

Wu, Z., et al. "Friend Recommendation According to Appearances on Photos" Proceeding MM '09 Proceedings of the 17th ACM international conference on Multimedia. Oct. 2009. pp. 987-988.

Xu, et al., "Online Crowdsourcing Subjective Image Quality Assessment," Proceedings of the 20th ACM international conference on Multimedia, Oct. 2012. (pp. 359-368).

Non-Final Office Action for U.S. Appl. No. 14/055,387 mailed on Apr. 8, 2016.

* cited by examiner

GENERATING A TRAINING MODEL BASED ON FEEDBACK

BACKGROUND

Embodiments of the present invention relate to rating samples, and more specifically, to a method and apparatus for generating a training model based on feedback in a rating system, and to a corresponding computer program product.

With the development of computer technology and artificial intelligence technology, it is possible to automatically and intelligently rate various data samples using a computer. An automatic rating system may learn standards which are adopted by experts (or users) to rate representative samples, generate training models by using these learned rating standards, and then rate other to-be-rated samples by using these training models.

Usually there is an enormous amount (e.g., hundreds of thousands or even millions) of to-be-rated samples. Hence, it is necessary to collect from users, scores of a considerable number of samples, so as to ensure the accuracy of the training model used in rating. However, for a specific user, it is time-consuming and laborious to rate thousands of samples, and the user is likely weary, such that errors might occur. Errors may include, for example, inconsistency between rating standards, misoperation and the like, which further cause "noise" during rating samples. These problems will affect the accuracy of the generated training model and further the accuracy of automatic rating.

SUMMARY

Therefore, it is desired to develop a technical solution capable of generating a training model accurately and efficiently, and it is desired that the technical solution can reduce the number of samples to be rated by a user as much as possible while ensuring the accuracy of the training model; further, it is desired to detect and remove "noise" caused by user fatigue, misoperation and other errors as much as possible. To this end, the embodiments of the present invention provide a method and apparatus for generating a training model based on feedback, and a corresponding computer program product.

In one embodiment of the present invention, there is provided a method for generating a training model based on feedback, comprising: calculating an eigenvector of a sample among a plurality of samples; obtaining scores granted by at least one user for at least one of the plurality of samples in at least one round, comprising: obtaining scores granted by the at least one user for a first number of samples; in response to having detected, based on the eigenvector, an inconsistency between the scores granted by the at least one user for the first number of samples, obtaining scores granted by the at least one user for a second number of samples; and generating a training model based on the scores granted by the at least one user for the first and second numbers of samples.

In one embodiment of the present invention, the obtaining scores granted by at least one user for at least one of the plurality of samples comprises: for one user among the at least one user, providing at least two samples; obtaining original scores granted by the user for the at least two samples; and normalizing the original scores to obtain scores granted by the user for the at least two samples.

In one embodiment of the present invention, the samples are image data.

In one embodiment of the present invention, there is provided an apparatus for generating a training model based on feedback, comprising: a calculating module configured to calculate an eigenvector of a sample among a plurality of samples; an obtaining module configured to obtain scores granted by at least one user for at least one of the plurality of samples in at least one round, comprising: a first obtaining module configured to obtain scores granted by the at least one user for a first number of samples; a second obtaining module configured to, obtain scores granted by the at least one user for a second number of samples in response to having detected, based on the eigenvector, an inconsistency between the scores granted by the at least one user for the first number of samples; and a generating module configured to generate a training model based on the scores granted by the at least one user for the first and second numbers of samples.

In one embodiment of the present invention, the obtaining module further comprises: for one user among the at least one user, a providing module configured to provide at least two samples; a fifth obtaining module configured to obtain original scores granted by the user for the at least two samples; and a normalizing module configured to normalize the original scores to obtain scores granted by the user for the at least two samples.

In one embodiment of the present invention, the samples are image data.

By means of the method and apparatus of the present invention, the number of samples to be rated by a user may be dramatically reduced while changing the existing automatic rating system architecture as little as possible, for example, reducing the number of samples to be rated by a user when generating a training model to just a small fraction of the original or even lower (for example, reduced from ten thousand samples to hundreds of samples); besides, noise in the generated training model can also be detected and removed, thereby generating the training model more rapidly and accurately and further improving the efficiency and accuracy of assessing all samples.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and not in a limited manner. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
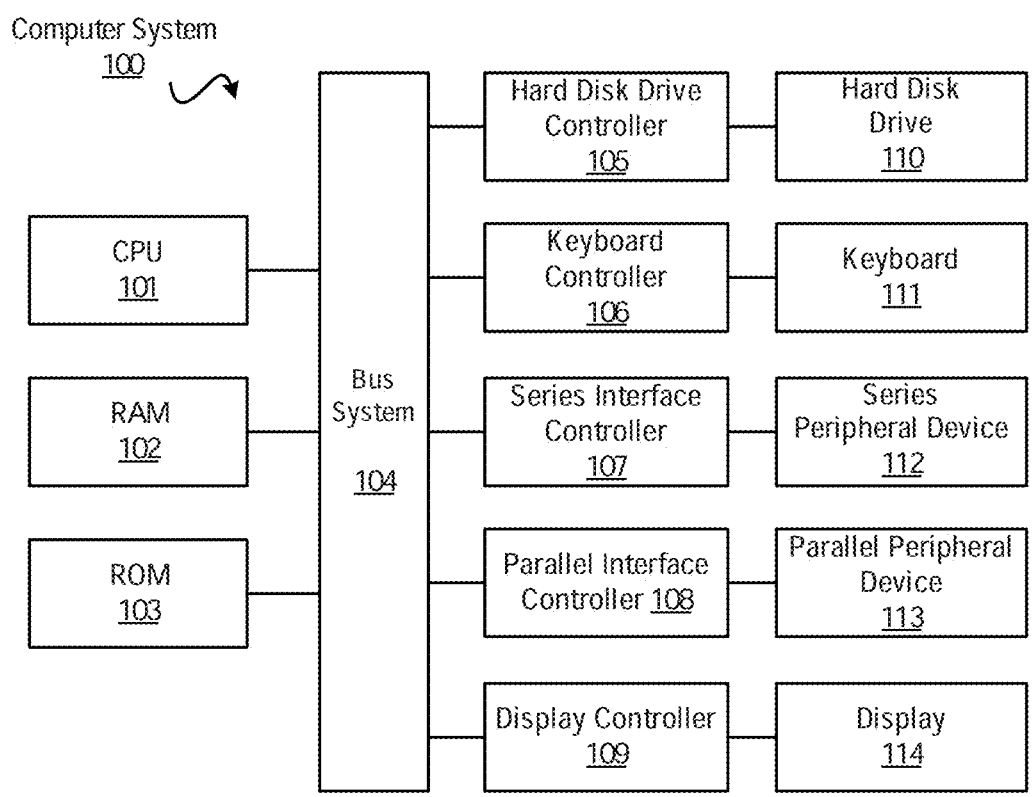
FIG. 1 schematically illustrates an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Processing Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108, and, Display 114 is coupled to Display Controller 109. It should be understood that the structure as illustrated in FIG. 1 is only for exemplary purposes rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
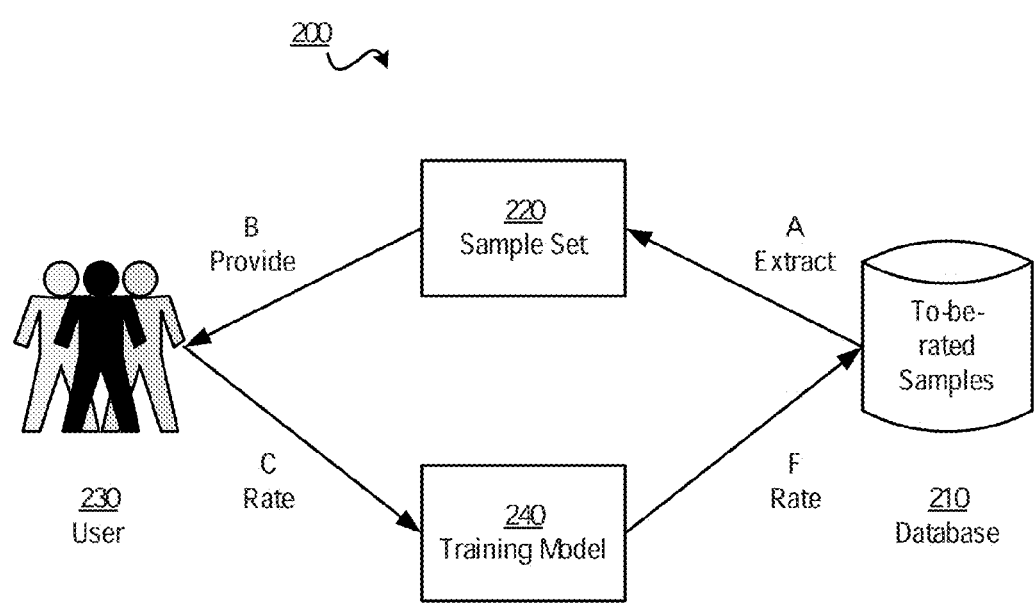
FIG. 2 schematically illustrates a schematic view of generating a training model and rating based on the training model according to a solution.

FIG. 2 schematically illustrates a schematic view 200 of generating a training model and rating based on the training model according to a solution. In this solution, a database 210 has to-be-rated samples stored therein. In an extraction step as illustrated by arrow A, a part of samples are selected (e.g., randomly selected) from the to-be-rated samples to form a sample set 220 as objects for rating by a user. It should be noted that once the extraction step ends, the number and content of the samples in the sample set 200 is fixed. The sample set 220 will be provided to a user 230 for rating (as illustrated by arrow C). The rating result is used for generating a training model 240. Subsequently in a rating step as illustrated by arrow F, all to-be-rated samples in the database 210 may be rated based on the built training model 240. It should be noted that the rating procedures as illustrated by arrows C and F have different meanings, i.e., the procedure illustrated by arrow C is a procedure in which the user 230 manually rates samples in the sample set 220, while the procedure illustrated by arrow F is a procedure of automatically rating all to-be-rated samples in the database 210 based on the generated training model 240.

In this solution, the sample set 220 cannot be changed after being extracted. No matter what score(s) of some sample(s) in the sample set 220 are, the user 230 is required to rate all samples in the sample set 220 before building the training model 240. At this point, the amount of samples in the sample set 220 is usually enormous (for example, millions of to-be-rated samples, the sample set is generally required to include thousands of samples), and thus it might take the user several or dozens of days to complete the rating. In addition, the sample set 220 might include redundant samples (e.g., samples with an extremely high similarity, etc.). All the above might have adverse impacts on the efficiency of generating the training model.

In view of these defects, the present invention proposes a method, apparatus and corresponding computer program product for generating a training model based on feedback. A design idea of the present invention lies in considering the similarity between to-be-rated samples and providing a user with a most typical sample among similar samples for rating. In addition, another design idea of the present invention lies in detecting inconsistent factors in rating one or more samples by one or more users and providing more samples to the one or more users to further confirm the users' actual rating results with a supposition that these inconsistent factors are caused by reasons such as a change of the users' rating standard, misoperation and so on.

Figure 3:
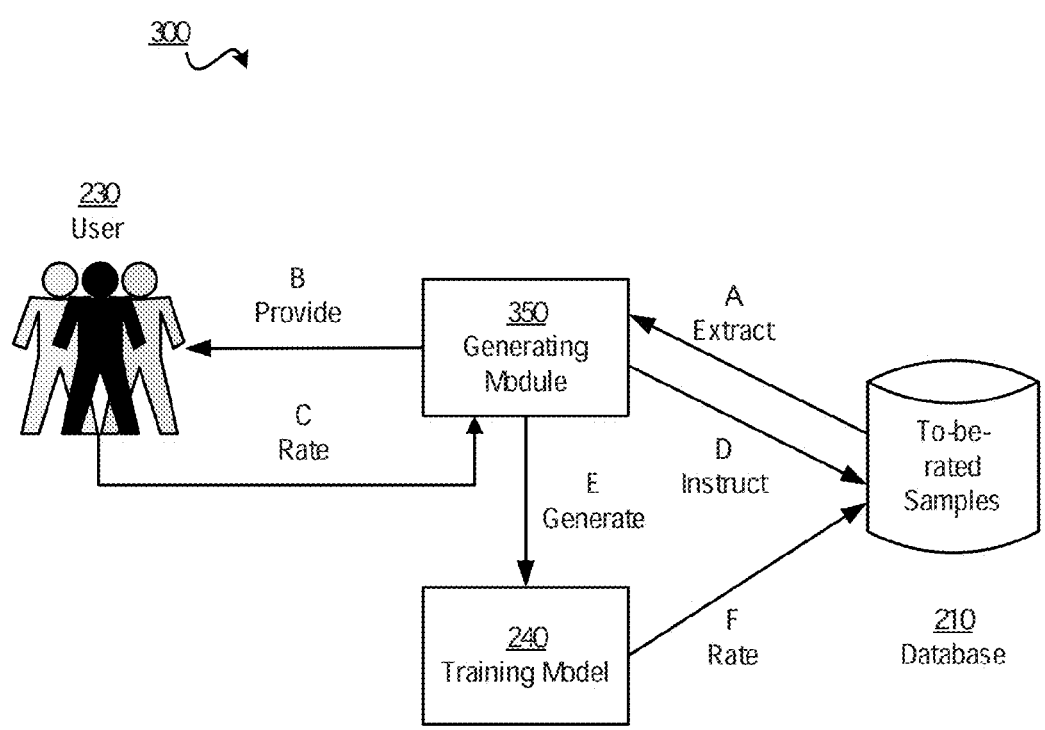
FIG. 3 schematically illustrates a schematic view of generating a training model and rating based on the training model according to one embodiment of the present invention.

FIG. 3 schematically illustrates a schematic view 300 of generating a training model and rating based on the training model according to one embodiment of the present invention. In this embodiment, the database 210 is for storing to-be-rated samples. An extraction step here (as illustrated by arrow A) is to extract a representative sample from the to-be-rated samples, other than randomly extracting a sample in the prior art. The extracted sample is provided to (as illustrated by arrow B) to the user 230 subsequent to passing through a generating module 350, and then the user 230 rates (as illustrated by arrow C) the extracted sample and inputs rating results to the generating module 350 for determining the consistency between the rating results. If an inconsistent factor is found in the rating results, then the database 210 is instructed (as illustrated by arrow D) to: extract from the database 210 more samples so as to further confirm the user's real intention. Through the providing and rating steps respectively illustrated by arrows B and C, if the inconsistent factor is removed from the rating results, then the training model 240 is generated (as illustrated by arrow E) based on the current rating results. Next, samples in the database 210 may be rated (as illustrated by arrow F) using the training model 240. The rating procedures as illustrated by arrows C and F in FIG. 3 are similar to the example described with reference to FIG. 2, which thus are not detailed here.

It should be noted that for the inconsistent factor in the rating results, the database 210 may be instructed one or more times to extract more samples; one or more samples may be extracted once, and the extracted samples may be either unrated or rated samples. In this embodiment, the same sample may be provided to the user 230 for several times.

It should be noted that in the context of the present invention, the embodiments of the present invention are illustrated with image data as an example of to-be-rated samples. The embodiments of the present invention may be applicable to various kinds of image content, such as car images, face images or any image content that may be rated based on a training model. Suppose many pictures of car (face) images are stored in the database, and it is desired to generate a training model based on feedback by analyzing scores granted by at least one user for different car appearances (human faces).

Figure 4:
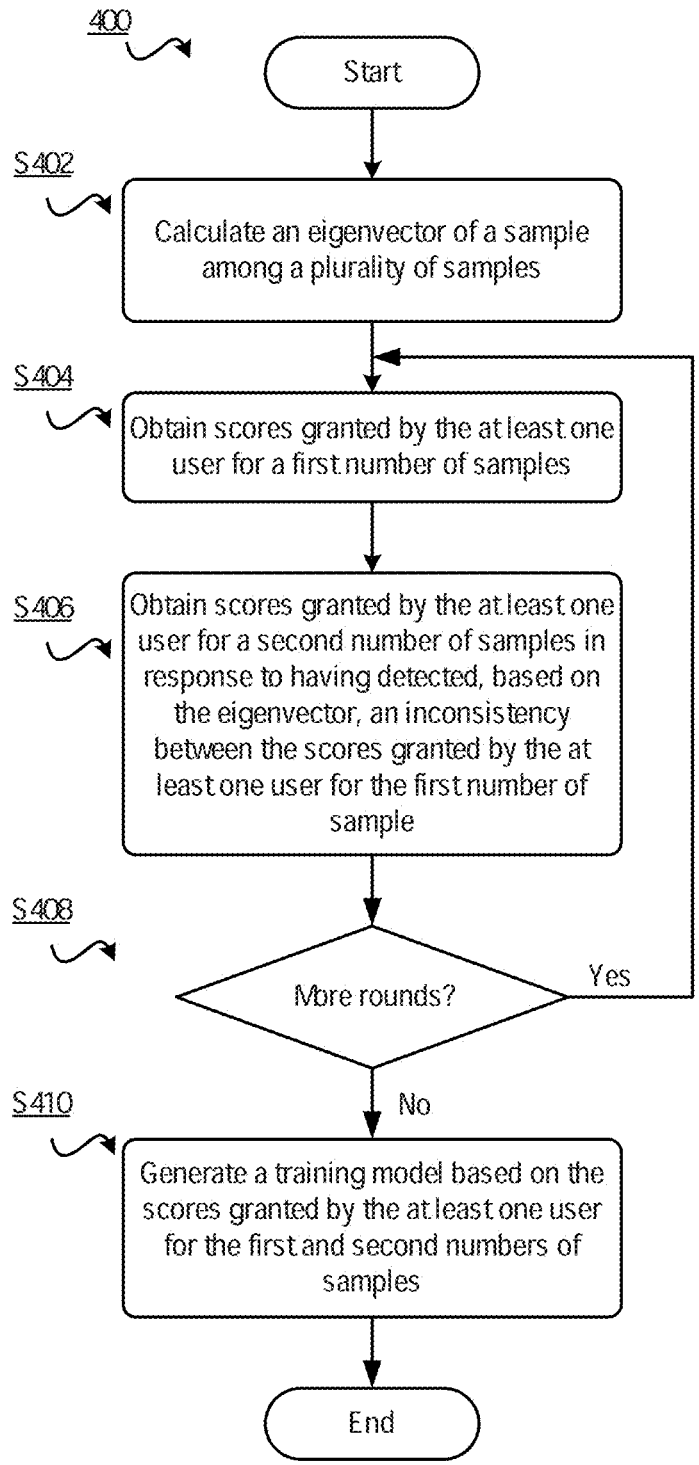
FIG. 4 schematically illustrates a flowchart of a method for generating a training model based on feedback according to one embodiment of the present invention.

FIG. 4 schematically illustrates a flowchart 400 of a method for generating a training model based on feedback according to one embodiment of the present invention. In this embodiment, there is provided a method for generating a training model based on feedback, comprising: calculating an eigenvector of a sample among a plurality of samples; obtaining scores granted by at least one user for at least one of the plurality of samples in at least one round, comprising: obtaining scores granted by the at least one user for a first number of samples in response to having detected, based on the eigenvector, an inconsistency between the scores granted by the at least one user for the first number of samples, obtaining scores granted by the at least one user for a second number of samples; and generating a training model based on the scores granted by the at least one user for the first and second numbers of samples.

First of all, an eigenvector of a sample among a plurality of samples is calculated in step S402. With respect to different types of image content, one or more standards may be defined, and an eigenvector of each of the plurality of samples is calculated based on the standard(s). For example, with respect to images with a content of cars, the color, brand or type of cars may be selected as a standard. Currently there are multiple methods for calculating an eigenvector for a specific standard based on the content of images. For example, when using the color of cars as a standard, first an RGB color parameter in a car body area may be extracted, and an eigenvector is calculated based on this color parameter; when using the brand as a standard, an image in a trademark area at the head of the car may be extracted, and an eigenvector is calculated based on an analysis on the trademark image, etc. Of course, those skilled in the art may further design different algorithms based on concrete demands, which are not detailed here.

Next, scores granted by at least one user for at least one sample of the plurality of samples are obtained. It should be noted that since the user needs to rate the plurality of samples, the procedure of obtaining scores need to be implemented in multiple rounds, and steps in each round include steps S404-S406.

In step S404, scores granted by the at least one user for a first number of samples are obtained. A concrete value for the first number may be predefined. In step S406, in response to having detected, based on the eigenvector, the inconsistency between the scores granted by the at least one user for the first number of samples, scores granted by the at least one user for a second number of samples are obtained. The present invention provides a method for generating a training model based on feedback, wherein a basis of the feedback is obtaining the inconsistency between currently already rated scores granted by a user, and confirming by means of providing more samples that the inconsistency is the user's real score or "noise" caused by misoperation and the like. Suppose a score range is an integer between 0 and 10. If historical scores granted by a specific user show that he/she gives high scores (e.g., 8-9) to black cars, but in one round of rating he/she gives a quite low score (e.g., 2) to one black car, then at this point it is considered that there is an inconsistency between the scores and more samples should be provided to the user.

Alternatively, after completion of one round of operations, in step S408 it is judged whether more rounds exist. A threshold number may be preset, for example, ending after 100 rounds or ending after the user has rated a sufficient number of samples.

Subsequently in step S410, a training model is generated based on the scores granted by the at least one user for the first and second numbers of scores. It should be noted that the embodiments of the present invention propose a method for gradually perfecting a training model incrementally in at least one round. Where the user's real scores have been confirmed and "noise" has been removed from the scores, a training model may be generated based on the scores granted by the at least one user for the first and second numbers of samples; or where the user's real scores have not been completely confirmed and "noise" has not been completely removed from the scores, a training model may be generated after the above steps S404-S406. In the latter case, it may be considered that a training model generated in each round is a to-be-perfected model, and this model may be optimized in following rounds of operations.

In one embodiment of the present invention, there is further comprised: clustering the plurality of samples into at least one group according to the eigenvector. A purpose of clustering the plurality of samples into a group is to ensure that the sample content at which the rating is targeted is representative. For example, the grouping may be based on an eigenvector extracted according to such a standard as car color. For example, the samples may be divided into 8 groups according to RGB values of car colors, i.e., red tones, green tones, blue tones, etc., and each group may be subdivided according to the color. At this point, the sample content in each group is representative with respect of colors, i.e., can represent sample data in certain color scope.

In addition, one or more other standards may be combined. For example, the samples are divided into such 3 groups as sedans, SUVs and trucks. These 3 groups are combined with the color-based 8 groups to form 24 groups, e.g., (red tones, sedans), (red tones, SUVs), etc.

In one embodiment of the present invention, at least one of the obtaining scores granted by the at least one user for a first number of samples and the obtaining scores granted by the at least one user for a second number of samples comprises: obtaining a score granted by the at least one user for at least one sample in each group of the at least one group. A purpose of grouping is to make at least one representative sample in each group be rated so as to comprehensively consider various representative factors in to-be-rated samples when building the training model. In this embodiment, the first and/or second number of samples as rated objects come from each group and cover each group of the at least one group. However, no limitation is imposed as to who rates at least one sample in each group, and instead, the rating may be conducted by the same or different users.

In one embodiment of the present invention, the obtaining a score granted by the at least one user for at least one sample in each group of the at least one group comprises: obtaining a score granted by one user among the at least one user for at least one sample in each group of the at least one group. In this embodiment, to promote the accuracy as much as possible, at least one sample in each group may be provided to the same user, with a score by the user being obtained. If scores by the same user for samples in each group cannot be obtained, then samples in each group may be provided to a plurality of users, and it is ensured that scores by the plurality of users cover each group.

In one embodiment of the present invention, at least one of the obtaining scores granted by the at least one user for a first number of samples and the obtaining scores granted by the at least one user for a second number of samples comprises: providing at least two samples to one user among the at least one user; obtaining original scores granted by the user for the at least two samples; and normalizing the original scores to obtain scores granted by the user for the at least two samples.

In this embodiment, when obtaining scores granted by the user for the samples (either the first number of samples or the second umber of samples), to-be-scored samples may be provided to the user in a pair-wise manner. According to the traditional rating manner of providing only one sample once, a problem might exist such that a reference is missed in each rating, which causes the inconsistency between rating standards. By providing samples to the user in a pair-wise manner, the user may fully consider his/her preference to two samples when rating; moreover, difference information between two original scores granted by the user for the two samples may be extracted as a basis for following calculation. It should be noted that in one embodiment of the present invention it is not limited specifically that only two samples are provided at a time. On the contrary, those skilled in the art may provide three or even four samples at a time according to actual situations.

Figure 5:
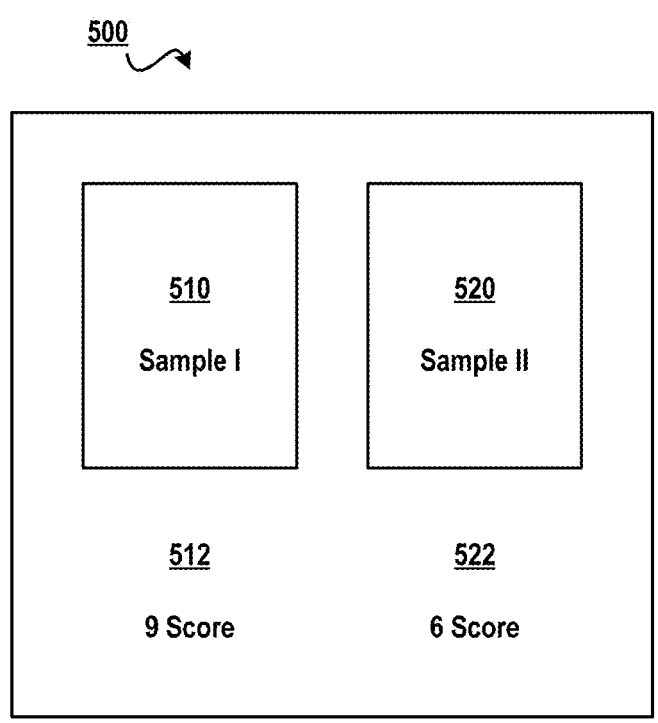
FIG. 5 schematically illustrates a schematic view of providing samples to a user and obtaining scores granted by the user for the samples according to one embodiment of the present invention.

The original scores mentioned here are scores which the user grants to the two samples. For example, the original scores are represented using the above-indicated integer range between 0 and 10. Further, those skilled in the art may use integers or real numbers in other ranges to represent the original scores. For example, a 0 score may represent the least preferred sample, while a 10 score may represent a favorite sample. FIG. 5 schematically illustrates a schematic view 500 of providing samples to the user and obtaining scores granted by the user for the samples according to one embodiment of the present invention. For example, two samples 510 and 520 may be provided to the user at a time, and scores 512 and 522 (a 9 score and a 6 score) by the user for these two samples may be obtained.

Next, the original scores (9 and 6) may be normalized to obtain scores granted by the at least one user for the at least two samples. The normalized scores mentioned here are global scores. However, it should be noted that a difference between two normalized global scores is not necessarily equal to a difference between two original scores.

Suppose $S_i$ is an original score in the $i^{th}$ round of rating, and $T_i$ is a normalized global score for the $i^{th}$ round. During normalizing original scores obtained in the $(i+1)^{th}$ round, an original score $S_{i+1}$ in the $(i+1)^{th}$ round needs to be introduced into an equation for incremental normalization. In other words, values of original scores $S_1, \ldots, S_i$ and global scores $T_1, \ldots, T_i$ in the first $i^{th}$ round are used as initial values for normalization in the $(i+1)^{th}$ round.

Suppose there are N samples, and 2 samples are provided to the user at a time in M rounds (since samples are allowed to appear in different pairs, typically 2M>=N). Let global scores obtained by normalizing original scores of each user for each sample be a set $T=\{T_1, T_2, \ldots T_i \ldots T_N\}$, at which point a global score $\{T_i\}$ corresponding to each sample needs to be evaluated. For the $i^{th}$ pair (i.e., the $i^{th}$ round) of N pairs of samples, suppose $S_i^+$ is a score for a sample the user prefers, and $S_i^-$ is a score for a sample the user does not prefer. A global score $T=\{T_1, T_2, \ldots T_i \ldots T_N\}$ for respective samples may be evaluated by minimizing the following equation, wherein $\lambda$ is a fixed parameter.

$$\min_{T} J(s) = \sum_{i=1}^{M} e^{((T_i^+ - T_i^-)^2 - (S_i^+ - S_i^-)^2)^2} + \lambda T^T T$$

In the above equation, the first term makes a difference between normalized scores for the two samples approach a relative difference of local comparison, and the second term is to prevent a score from being extremely high after being normalized, so it may be ensured that normalized scores are relatively reasonable. Based on different situations, those skilled in the art may further design other equations for normalization. Although the present invention involves normalization operations, the operation itself is not a focus of the present invention, which is thus not detailed. Those skilled in the art may perform the operation by referring to various algorithms in the prior art.

In one embodiment of the present invention, the obtaining scores granted by the at least one user for a second number of samples in response to having detected, based on the eigenvector, the inconsistency between the scores granted by the at least one user for the first number of samples comprises: if a difference between scores granted by a first user among the at least one user for similar samples exceeds a first threshold, providing to the first user more similar samples to obtain scores granted by the first user for the more similar samples.

In this embodiment, similar samples may be measured using a distance calculated on the basis of the eigenvector. The distance may be a distance value between two samples. Specifically, when using color as a standard, it may be derived that a distance between a red car and a black car is greater than a distance between two black cars; if using type as a standard, and then a distance between a sedan sample and a truck sample is greater than a distance between two truck samples.

In this embodiment, if a difference between scores granted by the first user for similar samples (e.g., red tones, sedans) exceeds a specific threshold (e.g., 1 score), then more similar samples (also red tones, sedans) may be provided to the first user to obtain scores granted by the first user for the more similar samples. One reason why a difference between scores granted by the same user for similar samples exceeds the specific threshold might lie in misoperation during rating. At this point, by providing more similar samples to the user, since the user is unlikely to perform misoperation time and again, "noise" in the user's scores can be removed. Another possible reason is that the user's scores indicate his/her real intention. At this point, more similar samples are provided; for example, the granularity of similarity between samples may be reduced (for example, dividing car colors into smaller groups). Or similar samples with other features may be provided, for example, considering car brands, so as to capture the user's more preferences.

It should be noted that in this embodiment "a difference between scores" refers to a difference between normalized global scores.

In one embodiment of the present invention, the obtaining scores granted by the at least one user for a second number of samples in response to having detected, based on the eigenvector, the inconsistency between the scores granted by the at least one user for the first number of samples comprises: if a difference between scores granted by similar users for a first sample among the plurality of samples exceeds a second threshold, providing the first sample to the similar users respectively once again so as to obtain scores granted by the similar users for the first sample.

The similarity between users may be measured by, for example, a Euclidean distance between vectors formed by scores by two users for the plurality of samples. Specifically, all samples may be clustered according to content in the above-described manner, thereby obtaining 24 groups. Then, user I respectively rates 100 samples belonging to the 24 groups, an average score may be calculated for each group, and 24 average scores may form vector I. Likewise, a similar vector II is also obtained from user II. Next, the similarity between the users may be obtained by calculating a Euclidean distance between vectors I and II. The shorter the distance is, the more similar the two users are. Those skilled in the art may define a threshold of similar users.

Suppose user I and user II are similar users. If a difference between scores by user I and user II for a specific sample exceeds a specific threshold (e.g., 2 score), then the sample may be provided once again to user I and user II so as to confirm whether "noise" caused by misoperation exists in the scores by the respective users.

In one embodiment of the present invention, the obtaining scores granted by the at least one user for a second number of samples in response to having detected, based on the eigenvector, the inconsistency between the scores granted by the at least one user for the first number of samples comprises: if a gap between the difference between the original scores by a user among the at least one user for two samples and the difference between normalized scores exceeds a third threshold, substituting one of the two samples by another sample among the plurality of samples.

As to normalization processing using the above equation, the mathematical difficulty in conversion (normalization is an optimization procedure and might not necessarily achieve an ideal optimization objective) might result in that a difference between normalized global scores (global difference for short) differs from the difference between original scores (original difference for short). When a gap between the global difference and the original difference is too big and exceeds a predetermined threshold (for example, the original difference is 5, whereas the global difference after normalization is 1, and the threshold is 3), it indicates that the normalized global scores deviate significantly from the user's original intention.

To tackle this problem, it is feasible to simply discard original samples 1 and 2 or substitute one (e.g., sample 1) of the original samples (sample 1 and sample 2) by another new sample 3, and compare scores for samples 3 and 2 or compare samples 3 and 1. By using this method, possible errors can be further removed during the generation of the training model, thereby improving the accuracy. It should be noted that a value of a threshold denotes a degree of inconsistency tolerance. The first, second and third thresholds may have the same or different settings. Those skilled in the art may set according to actual demands.

Figure 6:
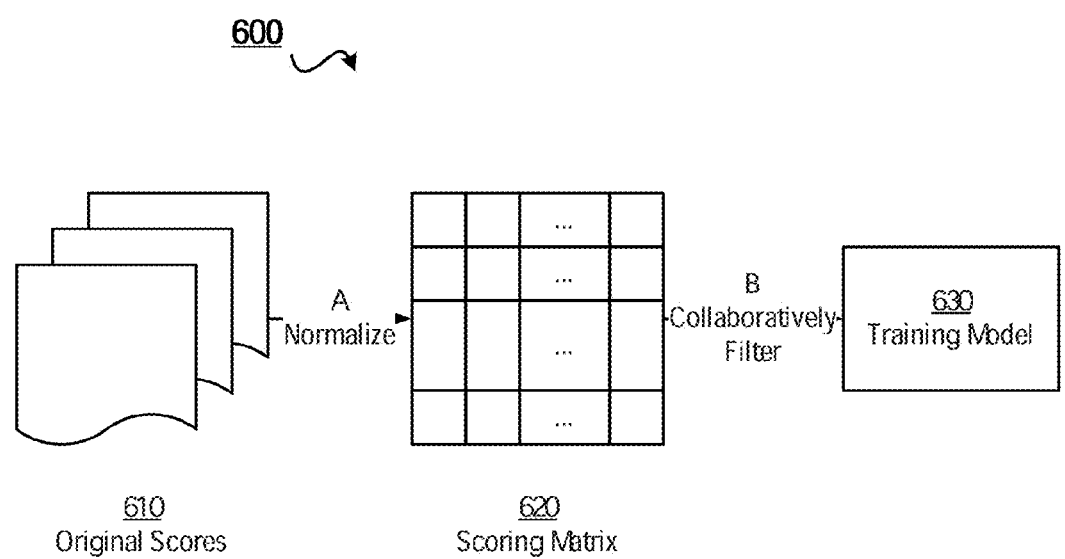
FIG. 6 schematically illustrates a schematic view of generating a training model according to one embodiment of the present invention.

In one embodiment of the present invention, the generating of a training model based on the scores granted by the at least one user for the first and second numbers of samples comprises: filling in a scoring matrix the scores granted by the at least one user for the first and second numbers of samples; and collaboratively filtering the scoring matrix to generate the training model. With reference to FIG. 6, a detailed description will be presented below to the procedure of generating the training model.

FIG. 6 schematically illustrates a schematic view 600 of generating a training model in each round according to one embodiment of the present invention. As illustrated by arrow A, first original scores 610 are normalized to fill in a scoring matrix 620; subsequently as illustrated by arrow B, the scoring matrix 620 is collaboratively filtered to generate a training model 630. It should be noted that in this embodiment the scores for filling in the scoring matrix are global scores calibrated based on feedback, which have considered the inconsistency between scores in the previous round and removed "noise" caused by user misoperation.

Those skilled in the art should understand that collaborative filtering is a relatively mature algorithm. Collaborative filtering has two aspects of meaning, that is, in a broad sense, referring to the processing of using collaborative technology to filter information or mode, and in a narrow sense, referring to a method for automatically predicting interests of a specific user by collecting preference or taste information from multiple users. In the embodiments of the present invention, collaborative filtering technology is used in its narrow sense for generating a training model based on predicting scores granted by other users. For concrete information on collaborative filtering technology and how to generate a training model, those skilled in the art may refer to such technical documents as http://en.wikipedia.org/wiki/Collaborative_filterin, Beyond Recommender Systems (Helping People Help Each Other, page 12, 2001) and the like.

Figure 7:
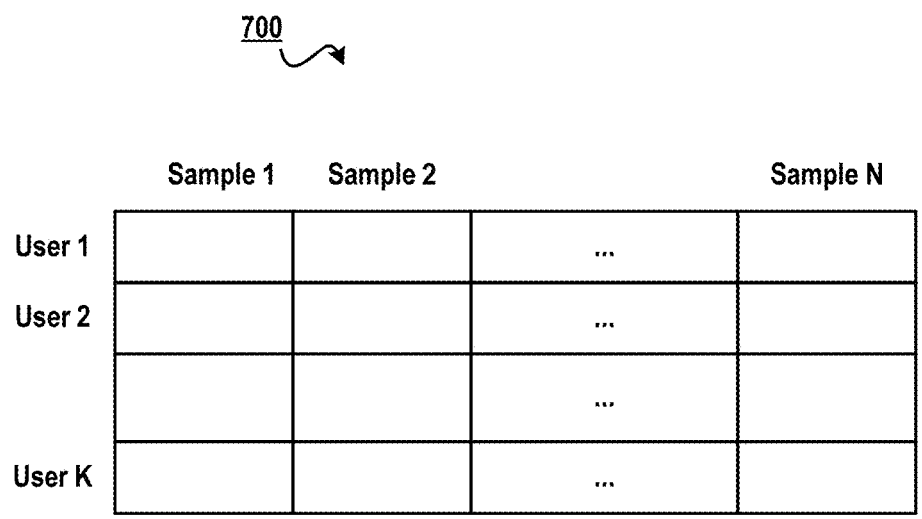
FIG. 7 schematically illustrates a schematic view of a data structure of a scoring matrix according to one embodiment of the present invention.

FIG. 7 schematically illustrates a schematic view 700 of a data structure of a scoring matrix according to one embodiment of the present invention. In the matrix illustrated in FIG. 7, each row represents one user, each column represents one sample, and a cross point of row and column represents a score by user x for sample y. Those skilled in the art may exchange locations of row and column or use a one-dimensional matrix or other data structure.

The procedure of generating a training model based on a scoring matrix will be illustrated below in detail. Table 1 below illustrates an example of a half full scoring matrix filled according to scores by at least one user.

TABLE 1

|  | Sample 1 | Sample 2 | Sample 3 | Sample 4 | Sample 5 | Sample 6 | Sample 7 | Sample 8 |
|---|---|---|---|---|---|---|---|---|
| User 1 | 6 |  | 6 |  |  | 7 |  | 9 |
| User 2 |  | 5 |  | 7 |  |  | 8 |  |
| User 3 | 4 |  | 5 |  |  |  | 7 |  |
| User 4 |  |  |  | 5 | 6 |  |  |  |

Suppose an eigenvector of each to-be-rated sample is extracted based on content of the sample and the to-be-rated samples are clustered into 8 groups based on the eigenvectors, then representative samples (samples 1-8) are selected from each group and scores granted by at least one user of multiple users (users 1-4) for the representative samples are obtained. In this manner, it may be ensured that the training model can cover different types in the to-be-rated samples.

Table 2 schematically illustrates a scoring model filled based on collaborative filtering, wherein blank cells in Table 1 are full. At this point, the filled scoring matrix illustrated in Table 2 can be used as a training model for next rating operation.

TABLE 2

|  | Sample 1 | Sample 2 | Sample 3 | Sample 4 | Sample 5 | Sample 6 | Sample 7 | Sample 8 |
|---|---|---|---|---|---|---|---|---|
| User 1 | 6 | 5.2 | 6 | 6.3 | 8.1 | 7 | 7.1 | 9 |
| User 2 | 4.3 | 5 | 6.3 | 7 | 8.6 | 8.3 | 8 | 9.2 |
| User 3 | 4 | 6.1 | 5 | 6.0 | 6.7 | 6.6 | 7 | 8.5 |
| User 4 | 4.8 | 3.8 | 4.3 | 5 | 6 | 6.4 | 7.2 | 8.0 |

Tables 3 and 4 below schematically illustrate another example of a half full scoring matrix filled according to scores by at least one user. At this point, although to-be-rated samples are clustered into 8 groups, scores granted by the user for representative samples (samples 1-7) in only 7 groups are obtained (as illustrated in Table 3, the column "Sample 8" is bank), so an uneven scoring matrix will be generated using collaborative filtering subsequently (as illustrated in Table 4, scores in the column "Sample 8" are all "0").

TABLE 3

|        | Sample 1 | Sample 2 | Sample 3 | Sample 4 | Sample 5 | Sample 6 | Sample 7 | Sample 8 |
|--------|----------|----------|----------|----------|----------|----------|----------|----------|
| User 1 | 6        |          | 6        |          | 4        | 7        |          |          |
| User 2 |          | 5        | 7        | 7        |          | 3        |          |          |
| User 3 | 4        | 8        | 5        |          | 1        |          | 7        |          |
| User 4 | 7        | 5        | 8        |          | 4        |          | 7        |          |

TABLE 4

|        | Sample 1 | Sample 2 | Sample 3 | Sample 4 | Sample 5 | Sample 6 | Sample 7 | Sample 8 |
|--------|----------|----------|----------|----------|----------|----------|----------|----------|
| User 1 | 6        | 4.2      | 6        | 6.3      | 4        | 7        | 4.1      | 0        |
| User 2 | 5.3      | 5        | 7        | 7        | 7.5      | 3        | 5.1      | 0        |
| User 3 | 4        | 8        | 5        | 2.4      | 1        | 6.8      | 7        | 0        |
| User 4 | 7        | 5        | 8        | 5.2      | 4        | 5.4      | 7        | 0        |

As is clear from the comparison between the examples illustrated in Tables 1-4, although the example illustrated in Table 3 uses more scores granted by the user (totaling 18), the filled scoring matrix illustrated in Table 4 is not quite ideal. The example illustrated in Table 1 only uses 12 scores granted by the user, since these scores completely cover 8 representative samples and are evenly distributed in the matrix, a more ideal training model is obtained.

In one embodiment of the present invention, the samples are image data. However, the embodiments of the present invention do not limit content of the image data, but may be applicable to any image data capable of extracting eigenvectors based on the image content.

Figure 8:
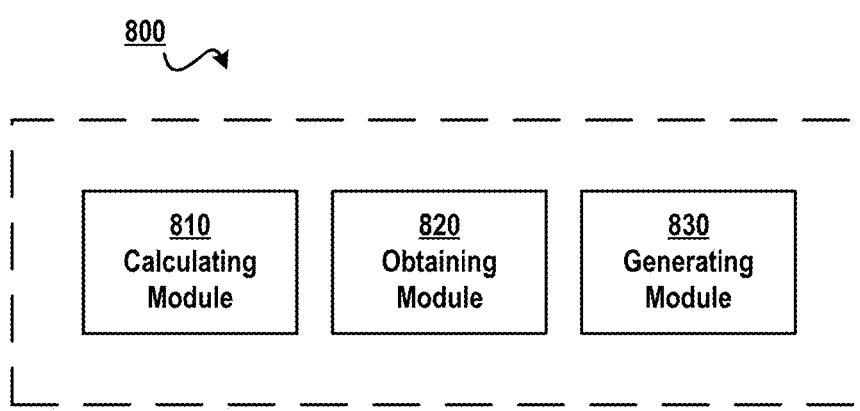
FIG. 8 schematically illustrates a block diagram of an apparatus for generating a training model based on feedback according to one embodiment of the present invention.

FIG. 8 schematically illustrates a block diagram of an apparatus for generating a training model based on feedback according to one embodiment of the present invention. In this embodiment, there is provided an apparatus 800 for generating a training model based on feedback, comprising: a calculating module 810 configured to calculate an eigenvector of a sample among a plurality of samples; an obtaining module 820 configured to obtain scores granted by at least one user for at least one of the plurality of samples in at least one round, comprising: a first obtaining module configured to obtain scores granted by the at least one user for a first number of samples; a second obtaining module configured to, obtain scores granted by the at least one user for a second number of samples in response to having detected, based on the eigenvector, the inconsistency between the scores granted by the at least one user for the first number of samples; and a generating module 830 configured to generate a training model based on the scores granted by the at least one user for the first and second numbers of samples.

In one embodiment of the present invention, there is further comprised: a clustering module configured to cluster the plurality of samples into at least one group based on the eigenvector.

In one embodiment of the present invention, the first obtaining module and the second obtaining module comprise: a third obtaining module configured to obtain a score granted by the at least one user for at least one sample in each group of the at least one group.

In one embodiment of the present invention, the third obtaining module comprises: a fourth obtaining module configured to obtain a score granted by a user among the at least one user for at least one sample in each group of the at least one group.

In one embodiment of the present invention, the first obtaining module and the second obtaining module further comprise: a providing module configured to, for one user among the at least one user, provide at least two samples; a fifth obtaining module configured to obtain original scores granted by the user for the at least two samples; and a normalizing module configured to normalize the original scores to obtain scores granted by the user for the at least two samples.

In one embodiment of the present invention, the second obtaining module comprises: a sixth obtaining module configured to, if a difference between scores granted by a first user among the at least one user for similar samples exceeds a first threshold, providing more similar samples to the first user to obtain scores granted by the first user for the more similar samples.

In one embodiment of the present invention, the second obtaining module further comprises: a seventh obtaining module configured to, if a difference between scores granted by similar users for a first sample of the plurality of samples exceeds a second threshold, provide the first sample once again to the similar users respectively to obtain scores granted by the similar users for the first sample.

In one embodiment of the present invention, the second obtaining module further comprises: an eighth obtaining module configured to, if a gap between a difference between original scores granted by one user among the at least one user for two samples and a difference between normalized scores exceeds a third threshold, substitute one of the two samples with another sample of the plurality of samples.

In one embodiment of the present invention, the generating module comprises: a filling module configured to fill in a scoring matrix the scores granted by the at least one user for the first and second numbers of samples; and a second generating module configured to collaboratively filter the scoring matrix to generate the training model.

In one embodiment of the present invention, the samples are image data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for generating a training model based on feedback, comprising:
   calculating an eigenvector of an image data sample among a plurality of image data samples;
   obtaining total scores granted by at least one user for at least one of the plurality of image data samples in at least one round, comprising:
      obtaining first sample scores granted by the at least one user for a first number of image data samples;
      displaying a second number of image data samples to the at least one user for obtaining second sample scores granted by the at least one user for the second number of image data samples in response to having detected, based on the eigenvector, an inconsistency in the first sample scores; and
   generating a training model stored in non-transitory computer readable storage media based on the total scores granted by the at least one user.

2. The method according to claim 1, further comprising: clustering the plurality of image data samples into at least one group based on the eigenvector.

3. The method according to claim 2, wherein at least one of the first sample scores and the second sample scores comprises:
   obtaining a score granted by the at least one user for at least one image data sample in each group of the at least one group.

4. The method according to claim 1, wherein at least one of the first sample scores and the second sample scores, comprises: for one user among the at least one user,
   providing at least two image data samples;
   obtaining original scores granted by the user for the at least two image data samples; and
   normalizing the original scores to obtain scores granted by the user for the at least two image data samples.

5. The method according to claim 1, wherein obtaining the second sample scores, comprises:
   if a difference between scores granted by a first user among the at least one user for similar image data samples exceeds a first threshold, providing more similar image data samples to the first user to obtain scores granted by the first user for the more similar image data samples.

6. The method according to claim 1, wherein the obtaining the second sample scores, comprises:
   if a difference between scores granted by similar users for a first image data sample of the plurality of image data samples exceeds a second threshold, providing the first image data sample once again to the similar users respectively to obtain scores granted by the similar users for the first image data sample.

7. The method according to claim 1, wherein the obtaining the second sample scores, comprises:
   if a gap between a difference between original scores granted by one user among the at least one user for two image data samples and a difference between normalized scores exceeds a third threshold, substituting one of the two image data samples with another image data sample of the plurality of image data samples.

8. The method according to claim 1, wherein the generating a training model based on the total scores granted by the at least one user, comprises:
   filling a scoring matrix with the total scores granted by the at least one user; and
   collaboratively filtering the scoring matrix to generate the training model.

* * * * *